US011920394B2

(12) United States Patent
Janick et al.

(10) Patent No.: US 11,920,394 B2
(45) Date of Patent: Mar. 5, 2024

(54) VERTICAL STABILITY ROLLER FOR VERTICALLY STACKING PANELS

(71) Applicant: CornellCookson, LLC, Mountain Top, PA (US)

(72) Inventors: James Janick, Shavertown, PA (US); Joseph A. Garrah, Nanticoke, PA (US)

(73) Assignee: CornellCookson, LLC, Mountain Top, PA (US)

( * ) Notice: Subject to any disclaimer, the term of this patent is extended or adjusted under 35 U.S.C. 154(b) by 0 days.

(21) Appl. No.: 17/844,178

(22) Filed: Jun. 20, 2022

(65) Prior Publication Data

US 2023/0407691 A1 Dec. 21, 2023

(51) Int. Cl.
*E05D 15/24* (2006.01)
*E05D 15/16* (2006.01)

(52) U.S. Cl.
CPC ........... *E05D 15/24* (2013.01); *E05D 15/165* (2013.01); *E05Y 2900/132* (2013.01)

(58) Field of Classification Search
CPC ..... E05D 15/24; E05D 15/165; E06B 9/0676; E06B 9/0638; E06B 3/927; E06B 3/925; E05Y 2900/106
See application file for complete search history.

(56) References Cited

U.S. PATENT DOCUMENTS 3,237,681 A * 3/1966 Huse ........................ B63B 19/18 160/188
5,685,355 A * 11/1997 Cook .................... E06B 9/0638 160/202
8,468,751 B2 * 6/2013 Williams .............. E05F 15/684 52/64
10,829,974 B2 11/2020 Letonje et al.
10,876,339 B2 * 12/2020 Bruckelmyer ...... E05B 17/0025
11,105,133 B2 * 8/2021 Sauve ................... E05D 15/242
2012/0285090 A1 * 11/2012 Williams ................ E04B 2/827 49/73.1
2014/0290878 A1 * 10/2014 Balay ...................... E06B 3/483 160/205
2017/0183897 A1 * 6/2017 Bruckelmyer ........ E05D 15/242
(Continued)

FOREIGN PATENT DOCUMENTS

DE 29506412 U1 * 8/1996 ........... E06B 9/0638
DE 29616252 U1 * 1/1998 ........... E06B 9/0638
(Continued)

OTHER PUBLICATIONS

English translation for DE29616252U1.*
(Continued)

*Primary Examiner* — Justin B Rephann

(57) ABSTRACT

In example implementations, an end cap for a panel of a vertically stacking panel door is provided. The end cap includes a body to be coupled to an end of a panel of a vertically stacking panel door, a first track wheel coupled to the body, a second track wheel coupled to the body, and a vertical stability roller coupled to the body, wherein the first track wheel, the second track wheel, and the vertical stability roller are arranged along a vertical line, wherein the first track wheel is located vertically above the second track wheel and the vertical stability roller is located between the first track wheel and the second track wheel.

5 Claims, 5 Drawing Sheets

(56) References Cited

U.S. PATENT DOCUMENTS

| | | | | |
|---|---|---|---|---|
| 2019/0153774 | A1* | 5/2019 | Balay | E06B 9/0676 |
| 2022/0098912 | A1 | 3/2022 | Janick et al. | |

FOREIGN PATENT DOCUMENTS

| | | | | | |
|---|---|---|---|---|---|
| DE | 296 16 252 | U1 | | 3/1998 | |
| DE | 19652577 | A1 | * | 6/1998 | E06B 9/0638 |
| DE | 10250284 | A1 | * | 5/2004 | E06B 9/0638 |
| WO | WO-2012014245 | A1 | * | 2/2012 | E06B 3/927 |
| WO | WO-2015155793 | A1 | * | 10/2015 | E06B 9/0676 |

OTHER PUBLICATIONS

International Search Report and Written Opinion mailed in corresponding PCT Application No. US2022/034139 dated Sep. 16, 2022, 9 pages.

* cited by examiner

VERTICAL STABILITY ROLLER FOR VERTICALLY STACKING PANELS

BACKGROUND

Overhead doors can be used for a variety of applications. For example, overhead doors can be used as garage doors in residential locations or doors for bays and entrances to warehouses in commercial locations.

Some overhead doors can be pulled open through a counterbalance system that includes a motor, a torsion spring, a rotating shaft connected to the motor and torsion spring, and a cable/strap system that connects to the bottom section of a door to the rotating shaft. Through the movement of the counterbalance system, the door moves along a track. Typically the moving doors can be moved along a track as the sections of the door are connected by hinges to lay horizontally with the floor along the track. If a door has door sections that are connected by hinges to assist in moving the sections along the track, then the design of the counterbalance system and the track alone provide the mechanism to open and close the door section.

DETAILED DESCRIPTION

Examples described herein provide examples of a vertical stability roller for panels of a vertically stacking panel door that is without hinged connections between each panel. As discussed above, currently available overhead doors are moved along a track by a counterbalance system. The door lies horizontally or parallel with the floor in a single piece.

However, since the vertically stacking panel door is formed by individual panels, there may be potential for some panels to fail to move through a panel interface zone as the door is opened. For example, the vertically stacking panel door may have individual disconnected panels that can move along a vertical track portion, then along a panel interface zone that transitions movement from a vertical movement to a horizontal movement, and then along a horizontal track portion where the individual panels can be stacked and stored when the door is fully opened.

The panel interface zone may have a small area where a top most track wheel of the panel may be free from interaction with any of the tracks in the panel interface zone. As a result, the panel may tilt at an angle and cause the top most track wheel to move into the lower horizontal track instead of into the upper horizontal track. This may cause the panel to get jammed and may prevent the door from opening properly.

The present disclosure provides a vertical stability roller to prevent the top most track wheel from entering the lower horizontal track and getting jammed. For example, the tracks of the panel interface zone may be modified to include an additional outer track on the lower track portion of the panel interface zone. The vertical stability roller may interact with the additional outer track to ensure that the panel remains vertical during a time where the top most wheel loses contact with either track in the panel interface zone as the panel is moving vertically upwards. As a result, the vertical stability roller may ensure that the top most track wheel enters the upper horizontal track and the lower most track wheel enters the lower horizontal track to prevent the panel from getting stuck and jamming the door while the door is opening.

Figure 1:
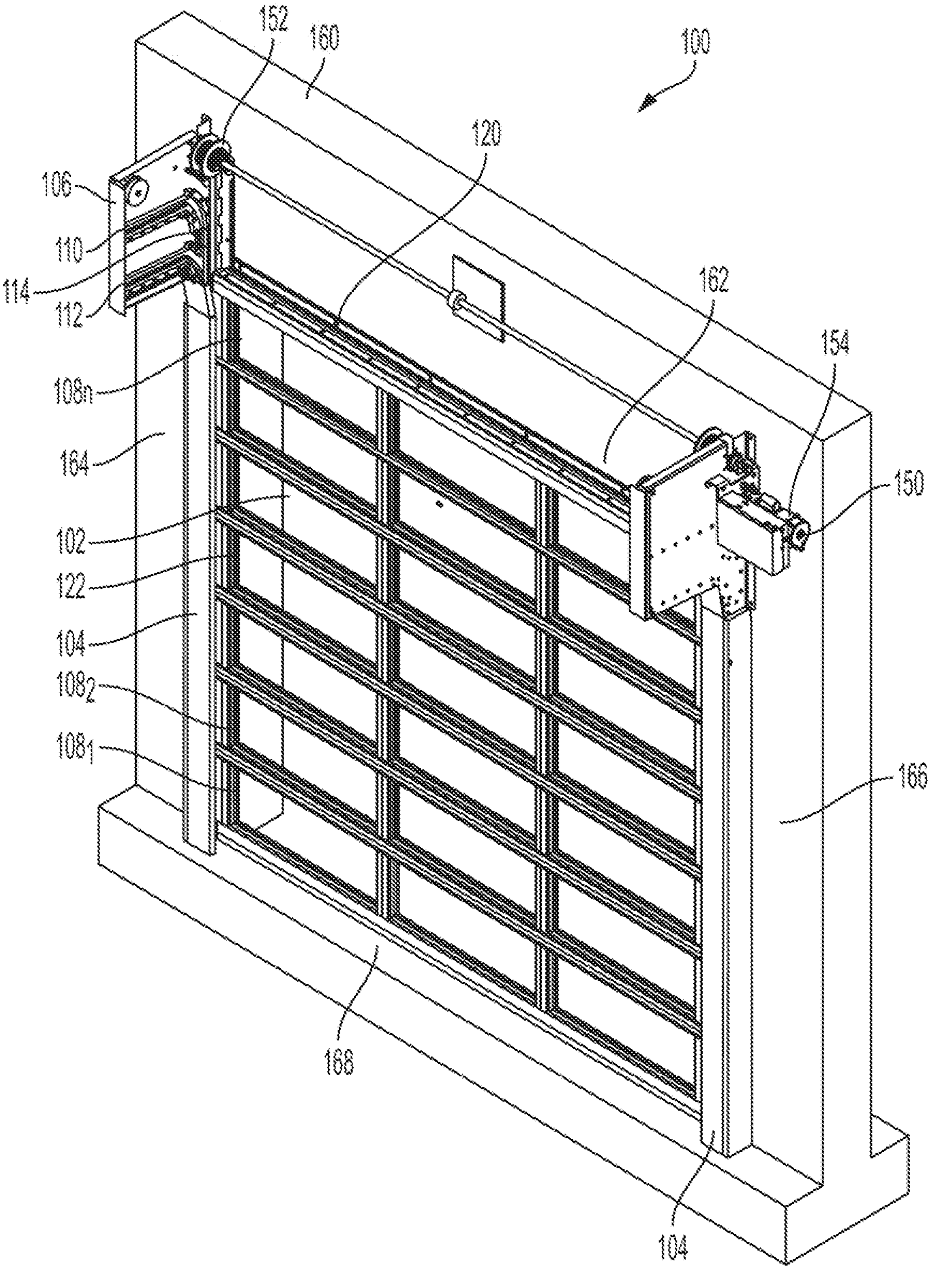
FIG. 1 illustrates an isometric view of an example of the vertically stacking panel door of the present disclosure.

FIG. 1 illustrates an isometric view of an example vertically stacking panel door system 100 of the present disclosure. The vertically stacking panel door system 100 may include a door 102 that is comprised of a plurality of vertically stacking disconnected panels $\mathbf{108}_1$ to $\mathbf{108}_n$ (hereinafter also referred to individually as a panel 108 or collectively as panels 108). The door 102 may be opened by moving the panels 108 vertically along a track or track system. The track system may include different track portions that define a path of how the panels 108 may move to open and close the door 102.

In one embodiment, the track may include opposing vertical track guides 104, a horizontal track guide 106, and a panel interface zone 114. The horizontal track guide 106 includes a first horizontal track portion 110 (also referred to herein as an upper horizontal track 110) and a second horizontal track portion 112 (also referred to herein as a lower horizontal track 112). The opposing vertical track guides 104 may include a first vertical track 104 on a first side of a door jamb 164 and a second vertical track 104 on a second side of a door jamb 166.

The panel interface zone 114 defines a transitional area between the vertical door guide 104 and a horizontal door guide 106. The panel interface zone 114 proves the means for lifting and separating the plurality of panels 108 when the door 102 is opening and to align and place the plurality of panels 108 in tangential connection when the door 102 is closing. As the panels 108 are separated, the panels 108 can be stacked along the horizontal track guide 106. As the panels 108 are aligned and tangentially connected, the panels 108 can be stacked in a vertical orientation along the opposing vertical track guides 104.

In one embodiment, the door 102 may be closed by moving the panels 108 towards the vertical door guide 104 one-by-one. The panels 108 may be stacked on top of one another as the door 102 is closed.

In one embodiment, the vertically stacking panel door system 100 may include a counterbalance system 150. The counterbalance system 150 may include a drum 152 which may be connected to a strap (not shown) that is coupled to the bottom most panel 108 (e.g., panel $\mathbf{108}_1$ in FIG. 1). The drum 152 may be coupled to a motor 154 and powered by the motor 154 or may be manually operated to rotate. The counterbalance system 150 may be further connected to a torsion spring (not shown). When the drum 152 is operated to open the door 102, the drum 152 may pull the bottom most panel 108 up, with the torsion spring providing forces to assist in the pull. When the drum 152 is operated to close the door 102, the drum 152 may rotate in an opposite direction to apply tension to the torsion spring and to allow the bottom most panel 108 to descend through the panel interface zone 114 and down the opposing vertical track guides 104 into a closed position.

Figure 2:
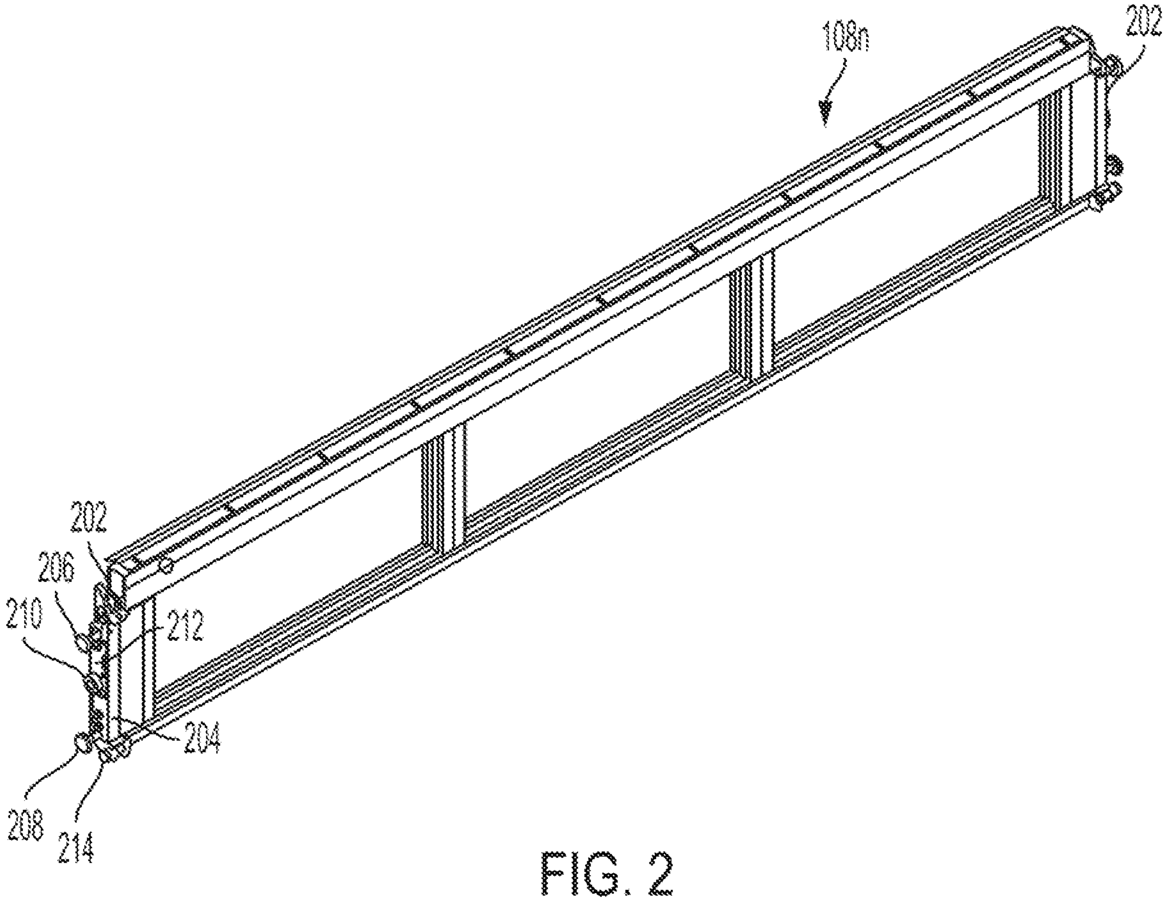
FIG. 2 is an isometric view of a top most panel of the vertically stacking panel door with an example vertical stability roller of the present disclosure.

FIG. 2 illustrates an isometric view of a top most panel $108_n$ of the door 102 with an example vertical stability roller 210 of the present disclosure. In an example, the vertical stability roller 210 may be added to only the top most panel $108_n$. In other words, the other panels $108_1$ to $108_{n-1}$ may not have the vertical stability roller as the above adjacent panel can provide stability for the lower panels once the top most panel $108_n$ is properly guided into the horizontal track guide 106.

In one embodiment, the top most panel $108_n$ may include end caps 202 on opposite ends of the panel $108_n$. In other words, a first end cap 202 may be coupled to a first end or outer end of the panel $108_n$ and a second end cap 202 may be coupled to a second end or outer end of the panel $108_n$. The first end and the second end of the panel $108_n$ may be on opposite sides of the panel $108_n$.

In one embodiment, the end cap 202 may include a body 204 that can be mechanically coupled to the top most panel $108_n$. For example, a screw, a nut and bolt, or any other type of mechanical fastener may be used to couple the body 204 of the end cap 202 to the top most panel $108_n$.

In one embodiment, a first track wheel 206, a second track wheel 208, and the vertical stability roller 210 may be coupled to the body 204. In one embodiment, the vertical stability roller 210 may be fabricated from a rubber or plastic material. The first track wheel 206 and the second track wheel 208 may be fabricated from a plastic, rubber, or metal material.

In one embodiment, the first track wheel 206 may be positioned above the vertical stability roller 210 and the second track wheel 208. The vertical stability roller 210 may be located between the first track wheel 206 and the second track wheel 208. The first track wheel 206 may travel from the vertical track guide 104, through the panel interface zone 114, and into the upper horizontal track 110. The second track wheel 208 may travel from the vertical track guide 104, through the panel interface zone 114, and into the lower horizontal track 112.

In one embodiment, the end cap 202 may also include a lower insert roller 214. The lower insert roller 214 may be added to the end cap 202 for every panel 108 except the bottom most panel $108_1$. The lower insert roller may follow a lower transition radius within the panel interface zone 114 to help guide lower panels 108 into the horizontal track guide 106. Since the bottom most panel $108_1$ does not have a panel below it, the lower insert roller 214 is not needed on the bottom most panel $108_1$. The lower insert roller 214 may be fabricated from a plastic or a rubber.

Figure 3:
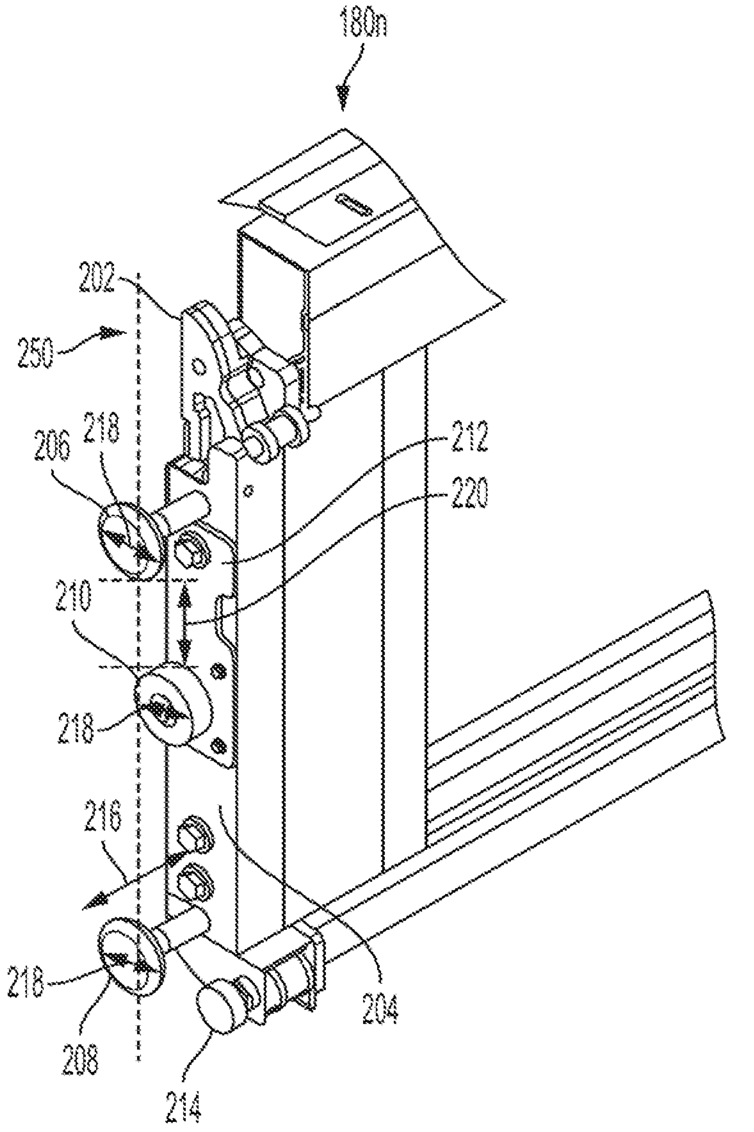
FIG. 3 is a close up view of an end of the top most panel with the example vertical stability roller of the present disclosure.

FIG. 3 illustrates a more detailed view of the end cap 202. In one embodiment, the vertical stability roller 210 may be coupled to a separate body 212. The separate body 212 may be mechanically coupled to the body 204. The separate body 212 may allow the vertical stability roller 210 to be retro-fitted for use in vertically stacking panel door systems 100 that may have been deployed without the vertical stability roller 210.

In one embodiment, the first track wheel 206 and the second track wheel 208 may protrude away from the body 204 in a direction shown by an arrow 216. A length that the first track wheel 206 and the second track wheel 208 protrude away from the body 204 may be equal. In other words, the first track wheel 206 and the second track wheel 208 may protrude away from the body 204 by an equal amount. The length at which the first track wheel 206 and the second track wheel 208 protrude may correlate to a dimension (such as depth) of the vertical track guide 104, the guides within the panel interface zone 114 (illustrated in FIGS. 4-6), and the horizontal track guide 106.

In one embodiment, the vertical stability roller 210 may also protrude away from the body 204. A length at which the vertical stability roller 210 protrudes away from the body 204 may be less than an amount at which the first track wheel 206 and the second track wheel 208 protrude away from the body 204. In one embodiment, a length at which the vertical stability roller 210 protrudes away from the body 204 may correlate to a dimension (such as a depth) of an additional outer track portion of the panel interface zone 114, illustrated in FIG. 6 and discussed below.

In one embodiment, a diameter (as measured along a dimension shown by an arrow 218) of the first track wheel 206 and the second track wheel 208 may be equal. In one embodiment, the first track wheel 206, the second track wheel 208, and the vertical stability roller 210 may have the same diameter. In one embodiment, the vertical stability roller 210 may have a different diameter from the first track wheel 206 and the second track wheel 208.

In one embodiment, the first track wheel 206, the second track wheel 208, and the vertical stability roller 210 may be vertically aligned. For example, the first track wheel 206, the second track wheel 208, and the vertical stability roller 210 may lie along a vertical line 250. In one embodiment, the first track wheel 206, the second track wheel 208, and the vertical stability roller 210 may also be centered along the vertical alignment on the vertical line 250. For example, a center of the first track wheel 206, the second track wheel 208, and the vertical stability roller 210 may lie on the vertical line 250.

The lower insert roller 214 may be offset from the first track wheel 206, the second track wheel 208, and the vertical stability roller 210. In other words, the lower insert roller 214 may not lie on the vertical line 250 with the first track wheel 206, the second track wheel 208, and the vertical stability roller 210.

In one embodiment, the first track wheel 206 and the vertical stability roller 210 may be spaced apart by a distance 220. The distance may be measured from a bottom point of the first track wheel 206 to a top point of the vertical stability roller 210. Dashed lines that are tangential to the bottom point of the first track wheel 206 and tangential to a top point of the vertical stability roller 210 are shown to illustrate the distance 220.

Figure 5:
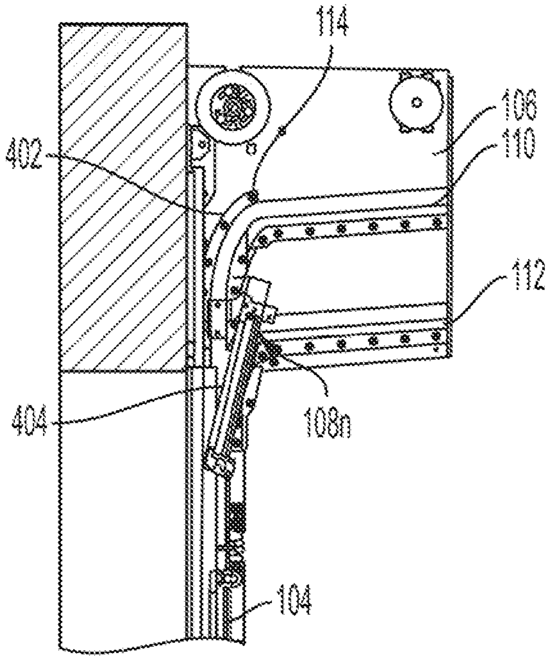
FIG. 5 is a side-view of the panel interface zone of the track system that illustrates how a top most panel may fail to move through a panel interface zone without the vertical stability roller of the present disclosure.
Figure 6:
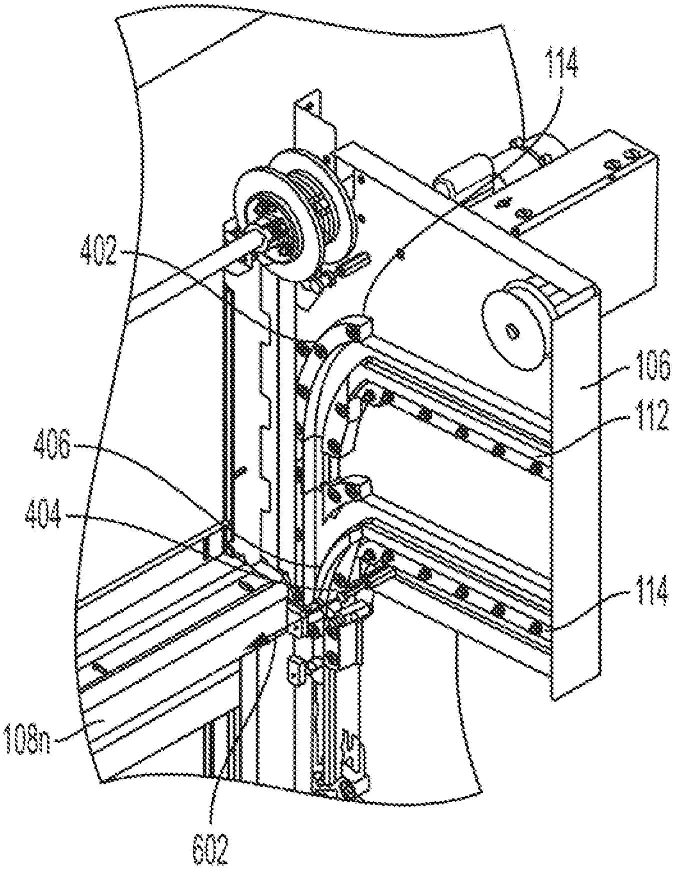
FIG. 6 is an isometric view of the panel interface zone of the track system that illustrates an example lower outer track to interact with the vertical stability roller of the present disclosure.

The distance 220 may correlate to a distance between an upper track portion and a lower track portion within the panel interface zone 114. Details of the panel interface zone 114 are illustrated in FIGS. 4-6 and discussed in further detail below.

Figure 4:
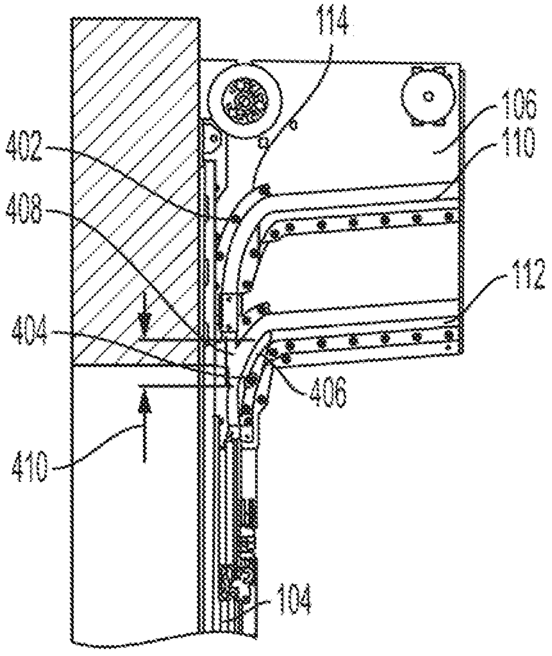
FIG. 4 is a side-view of a panel interface zone of a track system of the vertically stacking panel door of the present disclosure.

FIG. 4 shows a detailed side view of the panel interface zone 114. The panel interface zone 114 may include an upper track portion 402 and a lower track portion 404. The panel interface zone 114 provides a transition from a single vertical track guide 104 into a separate upper horizontal track 112 and lower horizontal track 114 of the horizontal track guide 106. The upper track portion 402 may be aligned and coupled with the upper horizontal track 112. The lower track portion 404 may be aligned and coupled with the lower horizontal track 114.

As can be seen in FIG. 4, the panel interface zone 114 may include a gap 408. The gap 408 may be an open area where the first track wheel 206 may travel without contact to any guide or track portions. The gap 408 may include an area where the panel interface zone 114 splits from a single vertical track that aligns with the vertical track guide 104 to the separate upper track portion 402 and the lower track portion 404.

A distance 410 between where lower track portion 404 begins to where the upper track portion 402 begins may define the gap 408. The lower track portion 404 may begin where the vertical track portion of the panel interface zone 114 goes from 90 degrees to less than 90 degrees. In other words, the lower track portion 404 may begin where the vertical track portion of the panel interface zone 114 begins to be angled towards the lower horizontal track 112.

The beginning of the upper track portion 402 can be defined by the point where the opening of the upper track portion 402 is formed. Parallel lines are drawn in FIG. 4 to illustrate where the lower track portion 404 begins and the upper track portion 402 begins to define the distance 410.

As discussed above, without the vertical stability roller 210, the top most panel $108_n$ may tilt, causing the first track wheel 206 to fall into the lower track portion 404 instead of travelling further upward into the upper track portion 402. This may cause the door 102 or the top most panel $108_n$ to jam or to get stuck when the door 102 is being opened.

FIG. 5 illustrates an example of how the top most panel $108_n$ may fail to move through the panel interface zone 114 without the vertical stability roller 210. As shown in FIG. 5, the first track wheel 206 may enter the gap 408, causing the top most panel $108_n$ to tilt or to fall into the lower track portion 404. As the lower panels 108 continue to move upward, the top most panel $108_n$ may get stuck in the panel interface zone 114, causing the door 102 to be jammed or preventing the door 102 from opening.

Referring back to FIG. 4, in one embodiment, the lower track portion 404 of the panel interface zone 114 may include an additional outer track portion 406. The additional outer track portion 406 may provide a surface to interact with the vertical stability roller 210. The interaction of the vertical stability roller 210 may provide vertical support for the top most panel $108_n$ to prevent the first track wheel 206 from falling into the lower track portion 404 when the first track wheel 206 enters the gap 408, as shown in FIG. 5.

In one embodiment, the distance 410 may be approximately equal to the distance 220 between the first track wheel 206 and the vertical stability roller 210, as illustrated in FIG. 3 and discussed above. Thus, the vertical stability roller 210 may contact the additional outer track portion 406 until the first track wheel 206 enters the upper track portion 402 of the panel interface zone 114. As a result, the combination of the vertical stability roller 210 and the additional outer track portion 406 may ensure that the top most panel $108_n$ is properly guided through the panel interface zone 114 and into the horizontal track guide 106.

FIG. 6 illustrates an isometric view of the panel interface zone 114 that shows additional details of the additional outer track portion 406. The additional outer track portion 406 may be formed as part of the lower track portion 404. The additional outer track portion 406 may protrude away from the panel interface zone 114 in a direction shown by an arrow 602.

The additional lower track portion 404 may be a curved surface that extends a lower surface of the lower track portion 404. The additional lower track portion 404 may have a same amount of curvature and follow the same path as the lower surface of the lower track portion 404.

The amount by which the vertical stability roller 210 protrudes from the body 202 may be defined by an amount by which the additional outer track portion 406 protrudes away from the panel interface zone 114. Similarly, the amount by which the first track wheel 206 and the second track wheel 208 protrude away from the body 202 may be defined by an amount by which the upper track portion 402 and the lower track portion 404 protrude away from the panel interface zone 114. Said another way, the length of the first track wheel 206, the second track wheel 208, and the vertical stability roller 210 may be set to allow the first track wheel 206 and the second track wheel 208 to move within the upper track portion 402 and the lower track portion 404 while the vertical stability roller 210 contacts the additional outer track portion 406.

Thus, as the first track wheel 206 and the second track wheel 208 enter the upper horizontal track 112 and the lower horizontal track 114, respectively, the vertical stability roller 210 may not contact the upper horizontal track 112 or the lower horizontal track 114. Said another way, once the top most panel $108_n$ enters the horizontal track guide 106, the vertical stability roller 210 does not contact any track surfaces or guides.

Thus, the vertical stability roller 210 in combination with the additional outer track portion 406 provides vertical stability for the top most panel $108_n$ when opening the door 102. The vertical stability roller 210 ensures that the top most panel $108_n$ remains vertical until the first track wheel 206 enters the upper track portion 402 of the panel interface zone 114. The vertical stability roller 210 and the additional outer track portion 406 prevents the door 102 from jamming or failing to open properly when opening the door 102.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A vertically stacking panel door system, comprising
- a vertically stacking panel door comprising a plurality of disconnected panels, wherein a top most panel of the plurality of disconnected panels comprises:
  - a first end cap coupled to a first end of the top most panel; and
  - a second end cap coupled to a second end of the top most panel, wherein the first end is opposite the second end, wherein each of the first end cap and the second end cap comprises:
    - a first track wheel coupled to a body;
    - a second track wheel coupled to the body; and
    - a vertical stability roller coupled to the body;
- a vertical track guide;
- a panel interface zone comprising an upper track portion and a lower track portion, wherein the lower track portion comprises an additional outer track portion, wherein the vertical stability roller is to interact with the additional outer track portion; and
- a horizontal track guide comprising an upper horizontal track that is coupled to the upper track portion of the panel interface zone and a lower horizontal track that is coupled to the lower track portion of the panel interface zone.

2. The vertically stacking panel door system of claim 1, wherein a distance between the vertical stability roller and the first track wheel is equal to a distance between the upper track portion and the additional outer track portion of the panel interface zone.

3. The vertically stacking panel door system of claim 1, wherein the first track wheel moves within the upper track portion of the panel interface zone, the vertical stability roller moves along the additional outer track portion of the panel interface zone, and the second track wheel moves within the lower track portion of the panel interface zone as the vertically stacking panel door is opening.

4. The vertically stacking panel door system of claim 1, wherein the vertical stability roller of the first end cap and the second end cap is coupled to a separate body that is mechanically coupled to the body of the first end cap and the second end cap.

5. The vertically stacking panel door system of claim 1, wherein the first track wheel, the vertical stability roller, and the second track wheel are aligned on a common vertical line and the vertical stability roller is located between the first track wheel and the second track wheel.

* * * * *